(12) United States Patent
Shattuck et al.

(10) Patent No.: US 7,373,809 B2
(45) Date of Patent: May 20, 2008

(54) METHOD FOR CONTROLLING A FILTER MAINTENANCE INDICATOR

(75) Inventors: Jared S. Shattuck, Indianapolis, IN (US); Scott E. Mundy, Carmel, IN (US); Mark A. Rains, Indianapolis, IN (US); Jeffrey E Shultz, Zionsville, IN (US)

(73) Assignee: General Motors Corporation, Detroit, MI (US)

( * ) Notice: Subject to any disclaimer, the term of this patent is extended or adjusted under 35 U.S.C. 154(b) by 64 days.

(21) Appl. No.: 11/534,251

(22) Filed: Sep. 22, 2006

(65) Prior Publication Data

US 2008/0072666 A1    Mar. 27, 2008

(51) Int. Cl.
*G01M 15/00* (2006.01)
(52) U.S. Cl. .................................. 73/119 R
(58) Field of Classification Search .............. 73/112, 73/115, 116, 117.2, 117.3, 118.1, 119 R; 116/28.1, DIG. 25, DIG. 42
See application file for complete search history.

(56) References Cited

U.S. PATENT DOCUMENTS

| 6,504,474 | B1 * | 1/2003 | Goodnight et al. | 340/439 |
| 7,168,304 | B2 * | 1/2007 | Beaucaire et al. | 73/119 R |
| 2003/0132147 | A1 * | 7/2003 | Rosendahl et al. | 210/130 |
| 2007/0125179 | A1 * | 6/2007 | Janik et al. | 73/744 |
| 2007/0144260 | A1 * | 6/2007 | Fei et al. | 73/596 |

* cited by examiner

*Primary Examiner*—Eric S. McCall

(57) ABSTRACT

A method for determining the condition of a transmission fluid filter and controlling an operator indicator to alert the operator that the fluid filter requires replacement is disclosed. The method includes monitoring a fluid pressure switch, determining an operating mode of the transmission, determining whether the operating mode of the transmission is changing, activating a timer if the operating mode is changing, recording the time, comparing the time to a predefined time threshold, determining whether the recorded time is greater than the predefined threshold, and activating the operator indicator to indicate that the fluid filter requires replacement if the recorded time is greater than the predefined threshold.

20 Claims, 8 Drawing Sheets

METHOD FOR CONTROLLING A FILTER MAINTENANCE INDICATOR

TECHNICAL FIELD

The invention relates to a method for monitoring and diagnosing the status of a vehicle fluid filter, especially, fluids under pressure.

BACKGROUND

Road vehicles that have powertrains require lubricating fluids to continuously operate. More specifically, the engine and especially, the automatic transmission, require lubricating fluids or oils to maintain their operation and extend their useful life. Additionally, these fluids are passed through filters to remove contaminants and metal shavings caused by normal operation of the powertrain. The lubricating fluids and filters need to be replaced on regular intervals during the life of the vehicle. Generally, the change interval for replacing the engine lubricating fluid and filter is different from the change interval for replacing the transmission lubricating fluid and filter. Often the vehicle owner or operator is unaware of when these lubricating fluids and filters require replacement. As a result, many times the fluids and filters go without replacement. Alternatively, the fluids and filters are replaced unnecessarily. If a filter is not changed at its required interval, damage can occur especially in the transmission. A plugged or clogged transmission filter can increase the pressure in the main case of the transmission causing damage.

Thus, there is a need for a method for determining the status of the fluid filters, especially, the transmission filter. The method should alert the vehicle operator or owner that the fluid filter needs to be replaced. Moreover, the method should also check for hardware faults in the fluid filter monitoring system.

SUMMARY

In an aspect of the present invention, a method is provided for determining the condition of a transmission fluid filter and controlling an operator indicator to alert the operator that the fluid filter requires replacement. The method includes monitoring a fluid pressure switch, determining an operating mode of the transmission, determining whether the operating mode of the transmission is changing, activating a timer if the operating mode is changing, recording the time, comparing the time to a predefined time threshold, determining whether the recorded time is greater than the predefined threshold, and activating the operator indicator to indicate that the fluid filter requires replacement if the recorded time is greater than the predefined threshold.

In still another aspect of the present invention, the method includes determining whether the fluid pressure switch is cycling between an on and an off state.

In still another aspect of the present invention, the method includes activating a cycling timer to record the number of times the pressure switch cycles.

In still another aspect of the present invention, the method includes comparing the number of cycles to a predefined cycle threshold.

In yet another aspect of the present invention, the method includes activating the operator indicator to indicate that the fluid filter requires replacement if the recorded cycles is greater than the predefined cycle threshold.

In yet another aspect of the present invention, the method includes determining whether the torque converter of the transmission is operating.

In yet another aspect of the present invention, the method includes determining whether the lockup clutch of the transmission is operating.

In yet another aspect of the present invention, determining an operating mode further comprises determining whether the ignition is on and the engine is off.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
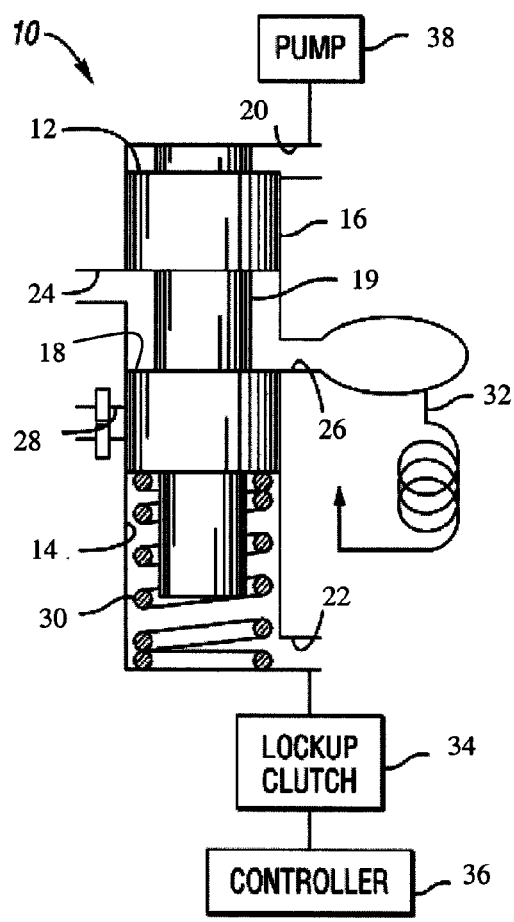
FIG. 1 is a cross-sectional view through the filter status detection device, wherein the detection device is in a first position, in accordance with an embodiment of the present invention.

Referring to the drawings, wherein like reference numbers refer to like components, in FIG. 1 a filter status detection device 10 is illustrated. Device 10 includes a valve 12 housed within a cavity 14. Valve 12 is movable from a first position, shown in FIG. 1, to a second position, shown in FIG. 2. Valve 12 preferably includes a first land 16 and a second land 18 connected by an intermediate shaft portion 19. First and second lands 16, 18 have the same diameter that is larger than the diameter of intermediate shaft portion 19. Cavity 14 has a first inlet port 20, a second inlet port 22, an exhaust port 24, a switch port 26, and an activation port 28. Fluid enters cavity 14 through first inlet port 20 at an inlet pressure equal to the inlet pressure of a fluid filter (i.e. a transmission oil filter), and through second inlet port 22 at an outlet pressure equal to the exit pressure of the filter. Fluid entering first inlet port 20 impinges upon valve 12, tending to push valve 12 away from first inlet port 20 and toward second inlet port 22, while fluid entering second inlet port 22 impinges upon the valve 12, tending to push valve 12 toward first inlet port 20 and away from second inlet port 22. A spring 30 having a spring constant equivalent to the desired allowable pressure drop biases valve 12 toward first inlet port 20.

Figure 2:
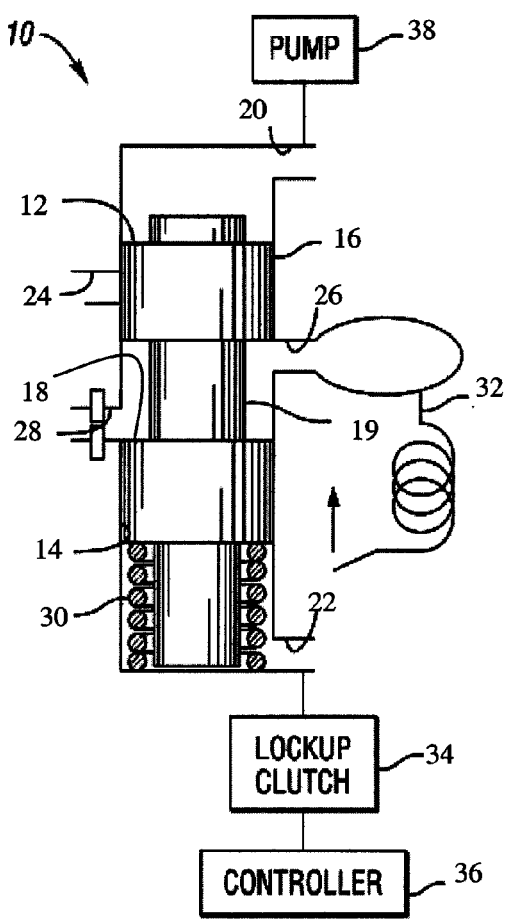
FIG. 2 is a cross-sectional view through the filter status detection device, wherein the detection device is in a second position, in accordance with an embodiment of the present invention.

If the fluid pressure of the fluid entering first inlet port 20 is greater than the fluid pressure of the fluid entering second inlet port 22 by enough to overcome the force of spring 30, valve 12 will move toward second inlet port 22 to the second position shown in FIG. 2. In the second position, activation port 28 is uncovered and fluid is allowed to enter cavity 14. Fluid flows through activation port 28 at a steady predetermined control pressure, for example 100 psi. Fluid from activation port 28 then travels around intermediate shaft portion 19 of valve 12 through switch port 26 to activate a fluid pressure switch 32 indicating an undesirable drop in fluid pressure due to a plugged filter. The first land 16 of the valve 12 blocks fluid that has entered cavity 14 through first inlet port 20 from reaching switch 32, thereby allowing even greater control of the force at which fluid influences switch 32. Additionally, using varying diameter portions first land 16 and intermediate shaft portion 19 also causes a hysteresis effect within cavity 14, such that once valve 12 moves toward second inlet port 22 and beyond a half-way position, the valve hysteresis effect will cause valve 12 to quickly move the rest of the way to the second position, shown in FIG. 2. The hysteresis effect will further cause valve 12 to remain in the second position until the pressure drop across the filter is sufficiently reduced. It can thus be seen that the hysteresis effect produced by the use of varying diameter portions of first land 16 and intermediate shaft portion 19 provides stability within device 10 by preventing valve 12 from cycling between the first and second positions.

In addition to detecting a plugged filter, device 10 of the present invention provides novel diagnostic capabilities, especially, in vehicles having a logic valve that selectively activates a lockup clutch 34. When the lockup clutch is engaged, a vehicle torque converter clutch is pressurized. Conversely, when the lockup clutch 34 is disengaged, the torque converter clutch is exhausted. Preferably, second inlet port 22 is coupled to the lockup clutch (not shown), such that fluid pressurizes cavity 14 through second inlet port 22 only when the lockup clutch 34 is engaged. When a vehicle engine is started, typically the lockup clutch 34 is disengaged. Thus, fluid enters cavity 14 through first inlet port 20, but not through second inlet port 22, causing valve 12 to move to the second position, thereby activating switch 32. If switch 32 does not activate upon engine start, which indicates to a vehicle controller 36 that either valve 12 is stuck in the first position, or switch 32 is malfunctioning. When the controller 36 activates the logic valve to engage the lockup clutch 34, fluid should pressurize cavity 14 through second inlet port 22, thereby moving valve 12 toward first inlet port 20 and deactivating switch 32 as activation port 28 is blocked by second land 18. If switch 32 does not turn off, that indicates to the vehicle controller 36 either that valve 12 is stuck in the second position, the filter is plugged, or there is some problem with the connection between second inlet port 22 and the lockup clutch 34. Failure of valve 12 to move from the first position to the second position when the lockup clutch is disengaged may also indicate a problem with a vehicle fluid pump 38. Specifically, if the fluid pump 38 has not primed, or has lost its prime, fluid within device 10 will not be pressurized, and minimal fluid will enter cavity 14. Thus, if the lockup clutch 34 is disengaged to prevent fluid from entering cavity 14 through second inlet port 22, but the fluid pump 38 is not working properly such that fluid does not enter cavity 14 through first inlet port 20, valve 12 will remain in the first position. It can thus be seen that the present invention provides diagnostic capabilities beyond detection of a plugged filter.

The present invention provides a method for determining whether the pressure switch and filter status detection device 10 is functioning properly at ignition on and engine off. Further, methods are provided for evaluating the filter pressure switch and detection device 10 when the valve of detection device 10 is transitioning from position one to position two and from position two to position one. Moreover, the methods of the present invention provide an indication to the operator of the vehicle that the switch 32 and detection device 10 are not functioning properly or that the fluid filter requires replacement. The operator is notified of a malfunctioning filter pressure switch and detection device 10 or the need for filter replacement by illuminating a warning light or activating an audible alarm.

Figure 3:
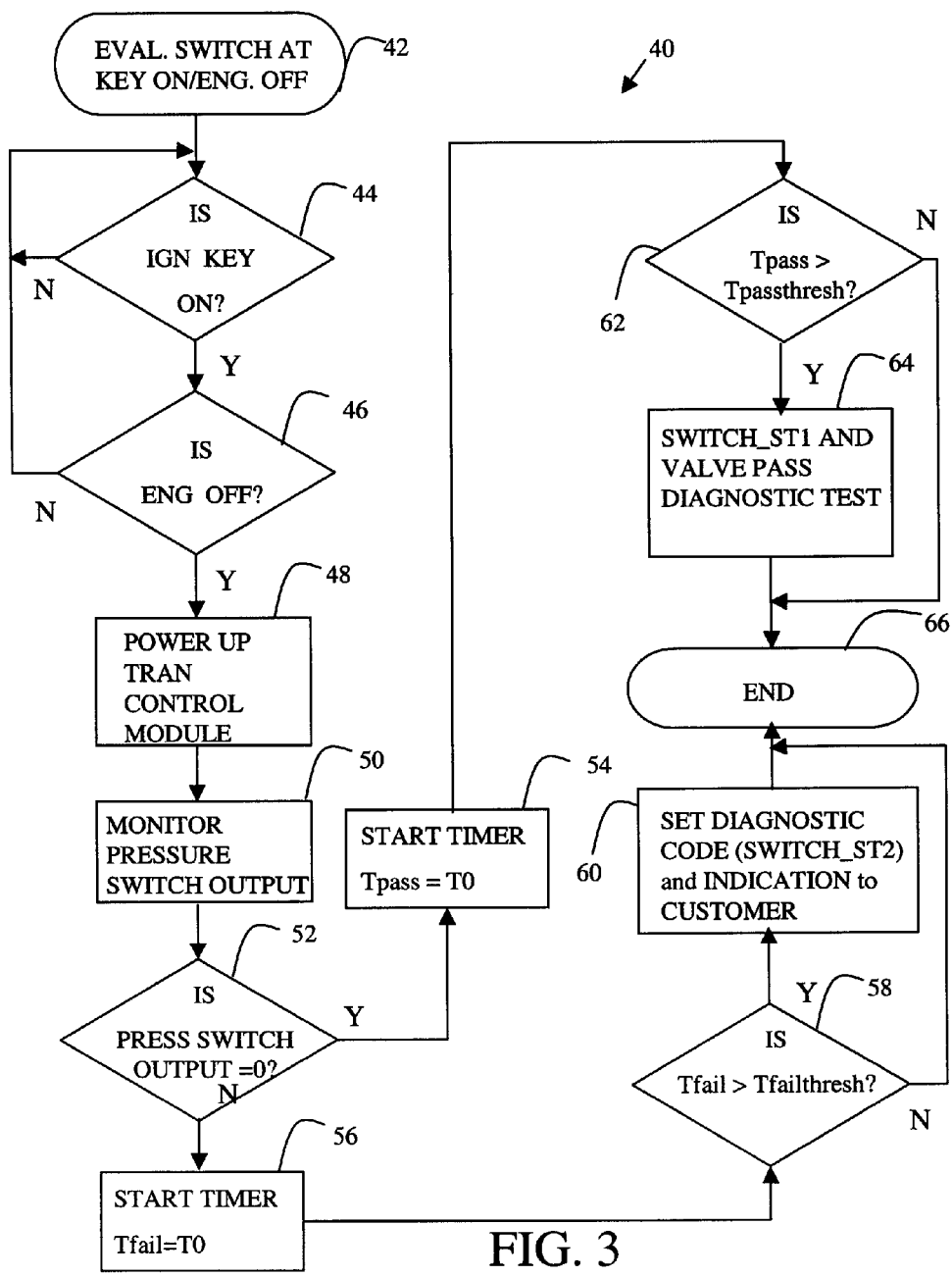
FIG. 3 is a flowchart illustrating a method for evaluating the status of the fluid filter using the detection device at ignition on and engine off, in accordance with an embodiment of the present invention.

Referring now to FIG. 3, a flowchart illustrating a method 40 for evaluating the status of the fluid filter using pressure switch 32 and device 10 is provided, in accordance with an embodiment of the present invention. At block 42, the switch 32 is evaluated at key on and engine off. If the ignition is on, at block 44, then the method determines whether the engine is on, at block 46. If the ignition is off, then the method returns to block 42. If the engine is off the transmission control module is powered on, as represented by block 48. If the engine is on, then the method returns to block 42. At block 50, the pressure switch is monitored. If the output of the pressure switch is zero or low, then a first timer Tpass is started, as represented by block 54. If the output of the pressure switch is one or high, then a second timer Tfail is started, as represented by block 56. At block 58, Tfail is compared to a predefined time threshold Tfailthreshold. If Tfail is greater than Tfailthreshold, then a diagnostic troubleshooting code is set and the operator of the vehicle is notified that the pressure switch 32 and device 10 are malfunctioning, as represented by block 60. If Tfail is less than Tfailthreshold, then Tfail is compared again to Tfailthreshold, as represented by block 58. At block 62, Tpass is compared to a predefined Tpassthreshold. If Tpass is greater than Tpassthreshold, then pressure switch 32 and device 10 pass the diagnostic test, as represented by block 64. If Tpass is less than Tpassthreshold, then Tpass is compared again to Tpassthreshold, as represented by block 62. The diagnostic routine ends at block 66.

Figure 4:
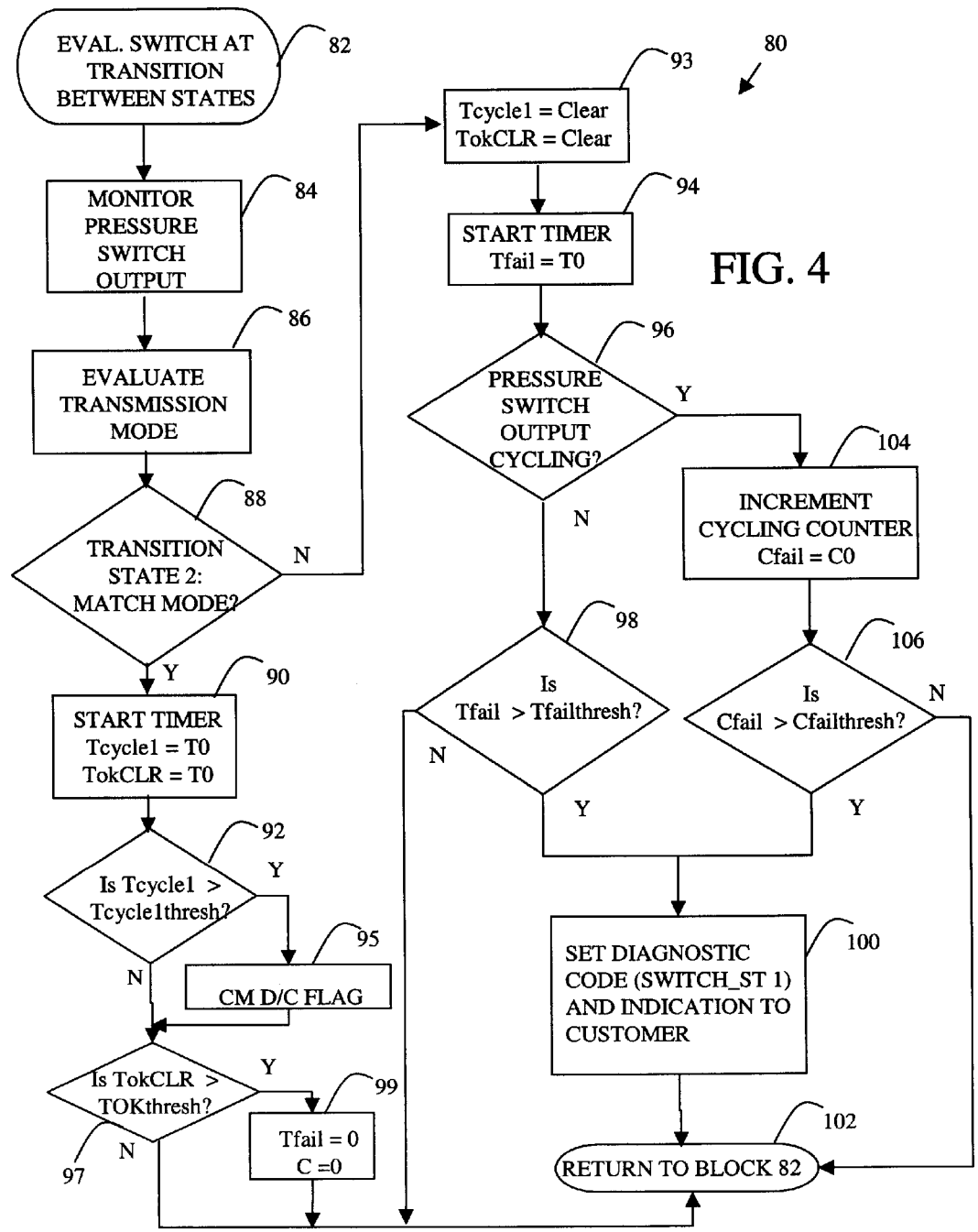
FIGS. 4 and 5 are flowcharts illustrating methods for evaluating the status of the fluid filter during the transition between operating states, in accordance with an embodiment of the present invention.
Figure 5:
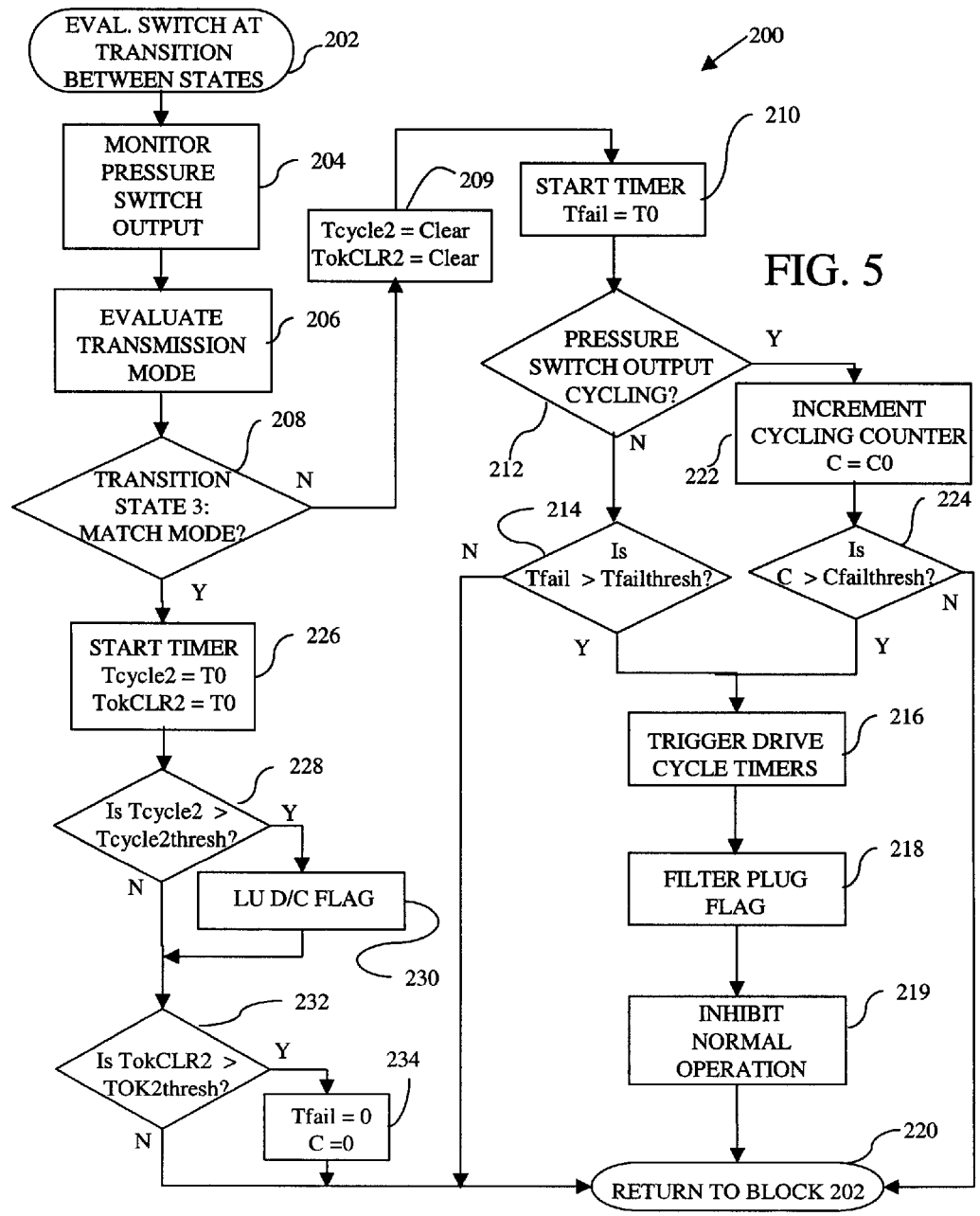

Referring now to FIGS. 4 and 5, flowcharts illustrating a method 80 and 200 for evaluating the status of the fluid filter using pressure switch 32 and device 10 during the transition between four different operating states is provided, in accordance with an embodiment of the present invention. The four operating states are: (1) initialization at engine start and pressure switch off and device 10 in position one; (2) torque converter operating and pressure switch on and device 10 in position two; (3) lockup clutch operating and pressure switch off and device 10 in position one; and (4) lockup clutch operating and pressure switch on and device 10 in position two. Method 80 evaluates the pressure switch output as the vehicle and device 10 transitions between states.

More specifically, method 80 is initiated at block 82. At block 84, the output of the pressure switch is monitored. The transmission mode and operating state is determined, at block 86. The method determines the transmission mode and operating state by monitoring, for example, the transmission fluid temperature, torque converter slip, and/or the application of the lockup clutch. At blocks 88, the method determines whether detection device 10 is transitioning between operating states. If the method determines that device 10 is not transitioning to state two, then a clear timer (TokCLR) and a cycle timer (Tcycle1) are cleared or set to zero and a timer (Tfail) is started and Tfail is set to zero, as represented by blocks 93 and 94. At block 96, the method determines whether the switch is cycling between on and off or a high and low voltage state or vice versa. If the switch is not cycling, then Tfail is compared to a Tfailthreshold, as represented by block 98. The Tfailthreshold is a calibratable amount of time that varies based on transmission operating conditions, such as transmission fluid temperature. For example, the method will access a lookup table that correlates a time threshold for a given transmission fluid temperature. If Tfail is greater than Tfailthreshold, then a diagnostic code indicating that the pressure switch has failed in State 1 (SWITCH_ST1) is set and a customer indicator is activated indicating that the pressure switch or device 10 requires servicing, as represented by block 100. However, if Tfail is not greater than Tfailthreshold, then diagnostic method 80 returns to block 82 until a diagnostic code has been set or the engine has been shutdown, as represented by block 102. If at block 96, it is determined that the pressure switch is cycling between a high and low voltage level or vice versa, then a cycling counter is set to zero (C=0) and incremented each time the switch cycles between off and on (or high and low or vice versa), as represented by block 104. At block 106, C is compared to a Cfailthreshold, which is a predefined number of cycles. If C is determined to be greater than Cfailthreshold, then a diagnostic code indicating the pressure switch has failed in State 1 (SWITCH_ST1) is set and a customer indicator is activated indicating that the pressure switch and/or device 10 is malfunctioning and requires servicing, as represented by block 100. Diagnostic method 80 returns to block 82 until a diagnostic code has been set or the engine has been shutdown, as represented by block 102

However, if the method determines that device 10 is transitioning to state two, then a cycle timer (Tcycle1 is initialized or set to zero) and a clear timer (TokCLR is initialized or set to zero), as represented by block 90. At block 92, Tcycle1 is compared to a predefined threshold (Tcyclethreshold). The Tcyclethreshold is a calibratable amount of time. If Tcycle1 is greater than Tcyclethreshold, then a converter mode drive cycle flag is set (CM D/C), as represented by block 95. However, if at block 92, Tcycle1 is not greater than Tcyclethreshold, then TokCLR is compared to a predefined threshold (TokCLRthreshold), as represented by block 97. If TokCLR is greater than TokCLRthreshold, then a Tfail timer is set to zero (Tfail=0) and a cycling counter is set to zero (C=0), as represented by block 99. However, if at block 97, TokCLR is not greater than TokCLR threshold, then diagnostic method 80 returns to block 82 until a diagnostic code has been set or the engine has been shutdown, as represented by block 102.

Referring now to FIG. 5, a flowchart illustrating method 200 for evaluating the status of the fluid filter using pressure switch 32 and device 10 during a transition between operating states is provided, in accordance with an embodiment of the present invention. More specifically, method 200 is initiated at block 202. At block 204, the output of the pressure switch is monitored. The transmission mode and operating state is determined, at block 206. At blocks 208, the method determines whether detection device 10 is transitioning to state three. The method determines the transmission mode and operating state by monitoring, for example, the transmission fluid temperature, torque converter slip, and/or the application of the lockup clutch. If the method determines that device 10 is not transitioning to state three, then a clear timer (TokCLR2) and a cycle timer (Tcycle2) are cleared or set to zero and a timer (Tfail) is initialized and set to zero, as represented by blocks 209 and 210. At block 212, the method determines whether the switch is cycling between on and off or high and low voltage level or vice versa. If the switch is not cycling, then Tfail is compared to a Tfailthreshold, as represented by block 214. If Tfail is greater than Tfailthreshold then the drive cycle timers are initialized, a fluid filter plugged flag is set and the vehicle, and specifically, the transmission is inhibited from operating normally, as represented by blocks 216, 218 and 219. Inhibiting normal operation of the transmission, for example, is limiting the number of gears the operator is allowed to access. For example, the operator may only be allowed to use reverse gears and $1^{st}$ gear through $4^{th}$ gear out of a gear range of reverse gear to $6^{th}$ gear. However, if Tfail is not greater than Tfailthreshold, then diagnostic method 200 returns to block 202 until a diagnostic code has been set or the engine has been shutdown, as represented by block 220. If at block 212, it is determined that the pressure switch is cycling, then a cycling counter is set to zero (C=0) and incremented each time the switch cycles between off and on (or a high and low voltage state or vice versa), as represented by block 222. At block 224, C is compared to a Cfailthreshold, which is a predefined number of cycles. If C is determined to be greater than Cfailthreshold, then the drive cycle timers are initialized, a fluid filter plugged flag is set and the vehicle, and specifically, the transmission is inhibited from operating normally, as represented by blocks 216, 218 and 219. However, if C is not greater than Cfailthreshold, then diagnostic method 200 returns to block 202 until a diagnostic code has been set or the engine has been shutdown, as represented by block 220.

However, if the method determines that device 10 is transitioning to state three, then a cycle timer (Tcycle2 is initialized and set to zero) and a clear timer (TokCLR2 is initialized and set to zero), as represented by block 226. At block 228, Tcycle2 is compared to a predefined threshold (Tcycle2threshold). If Tcycle2 is greater than Tcycle2threshold, then a lockup drive cycle mode (LU D/C) flag is set, as represented by block 230. However, if at block 228, Tcycle2 is not greater than Tcycle2threshold, then TokCLR2 is compared to a predefined threshold (TokCLR2threshold), as represented by block 232. If TokCLR2 is greater than TokCLR2threshold, then a Tfail timer is set to zero (Tfail=0) and a cycling counter is set to zero (C=0), as represented by block 234. However, if at block 232, TokCLR2 is not greater than TokCLR2threshold, then diagnostic method 200 returns to block 202 until a diagnostic code has been set or the engine has been shutdown, as represented by block 220.

Figure 6:
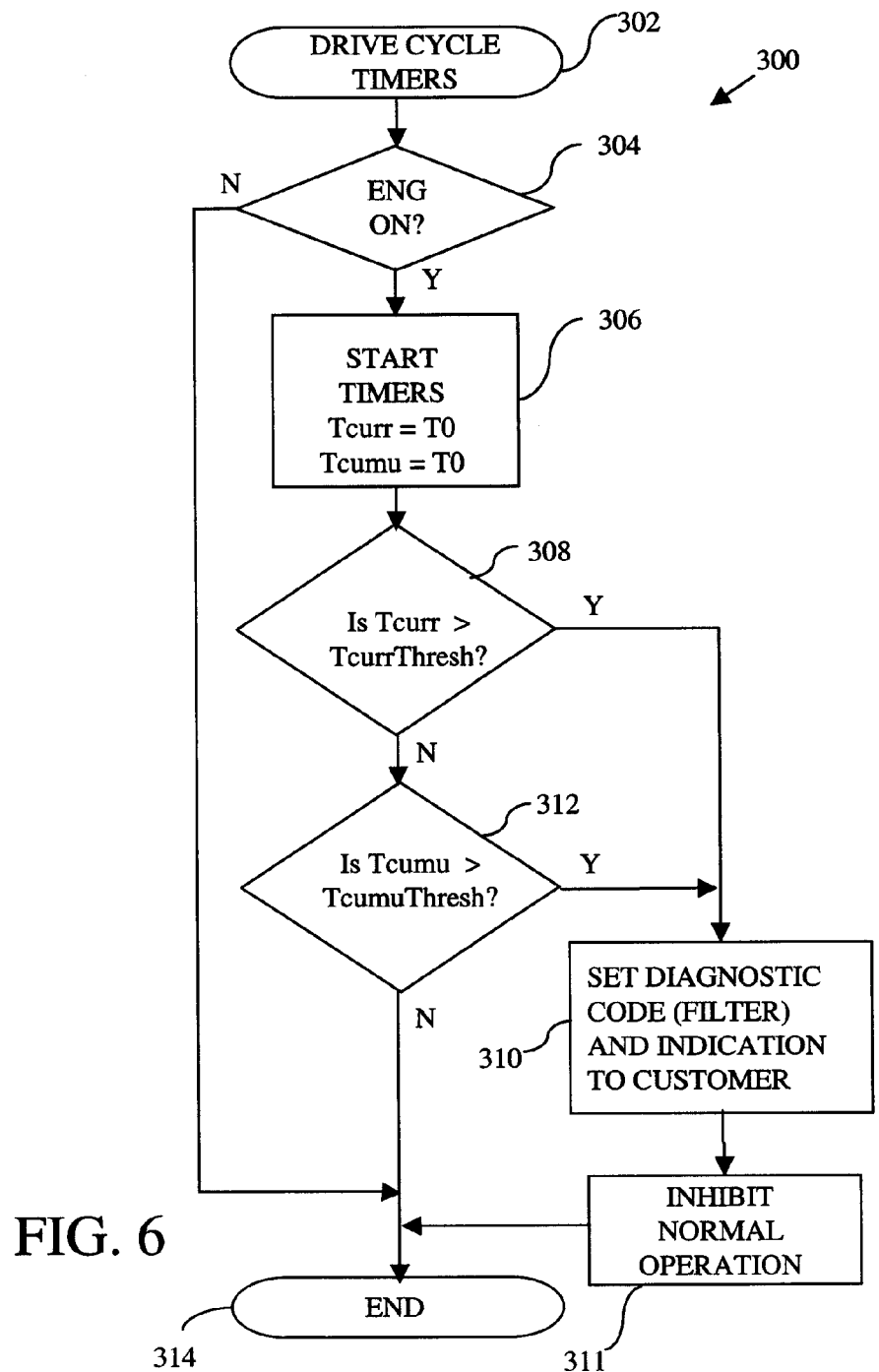
FIG. 6 is a flowchart illustrating method for evaluating the drive cycle timers, in accordance with an embodiment of the present invention.

Referring now to FIG. 6, a flowchart illustrating a method 300 for evaluating the drive cycle timers is provided, in accordance with an embodiment of the present invention. Method 300 is initiated at block 302. At block 304, the method determines whether the engine has been turned on (e.g. by monitoring the ignition switch and/or engine speed). If it is determined that the engine has been turned on, then a pair of drive cycle timers are started and initialized to zero (Tcurr and Tcumu), as represented by block 306. Tcurr records the time of the current drive cycle and Tcumu records the cumulative time from one drive cycle to the next. At block 308, Tcurr is compared to a predefined current drive cycle threshold (Tcurrthreshold). If Tcurr is greater than Tcurrthreshold, then a diagnostic code (Filter plugged) is set and a customer indicator is activated indicating that the fluid filter requires maintenance or changing, as represented by block 310. At block 311, the transmission is inhibited from operating normally. However, if at block 308, Tcurr is not greater than Tcurrthreshold, then Tcumu is compared to a predefined cumulative drive cycle threshold (Tcumuthreshold), as represented by block 312. If Tcumu is greater than Tcumuthreshold, then a diagnostic code (Filter plugged) is set and a customer indicator is activated indicating that the fluid filter requires maintenance or changing, as represented by block 310. At block 311, the transmission is inhibited from operating normally. If Tcumu is not greater than Tcumuthreshold, then the method terminates at block 314.

Figure 7:
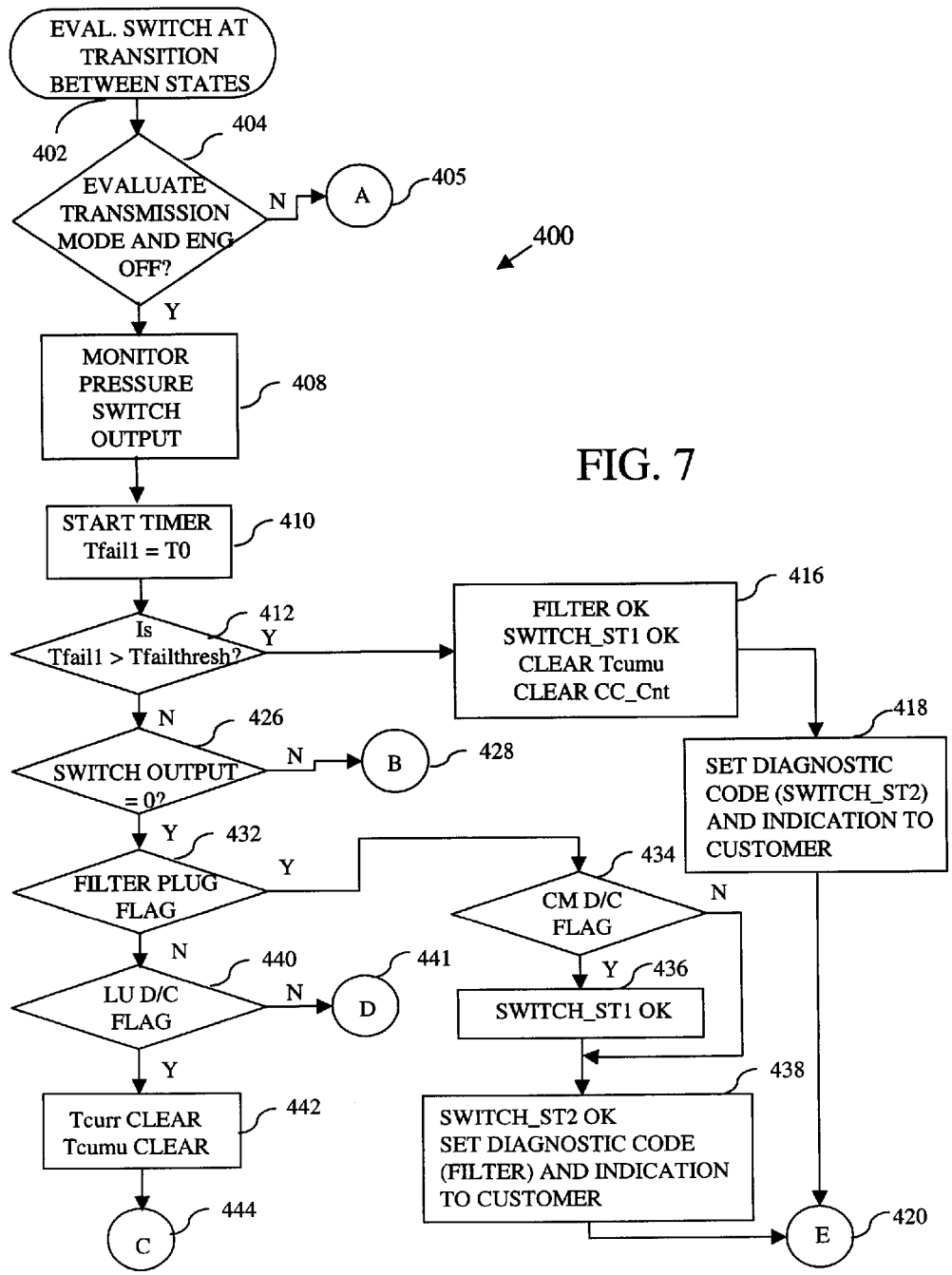
FIGS. 7 and 8 are flowcharts illustrating a method for evaluating the fluid filter at engine shutdown, in accordance with an embodiment of the present invention.
Figure 8:
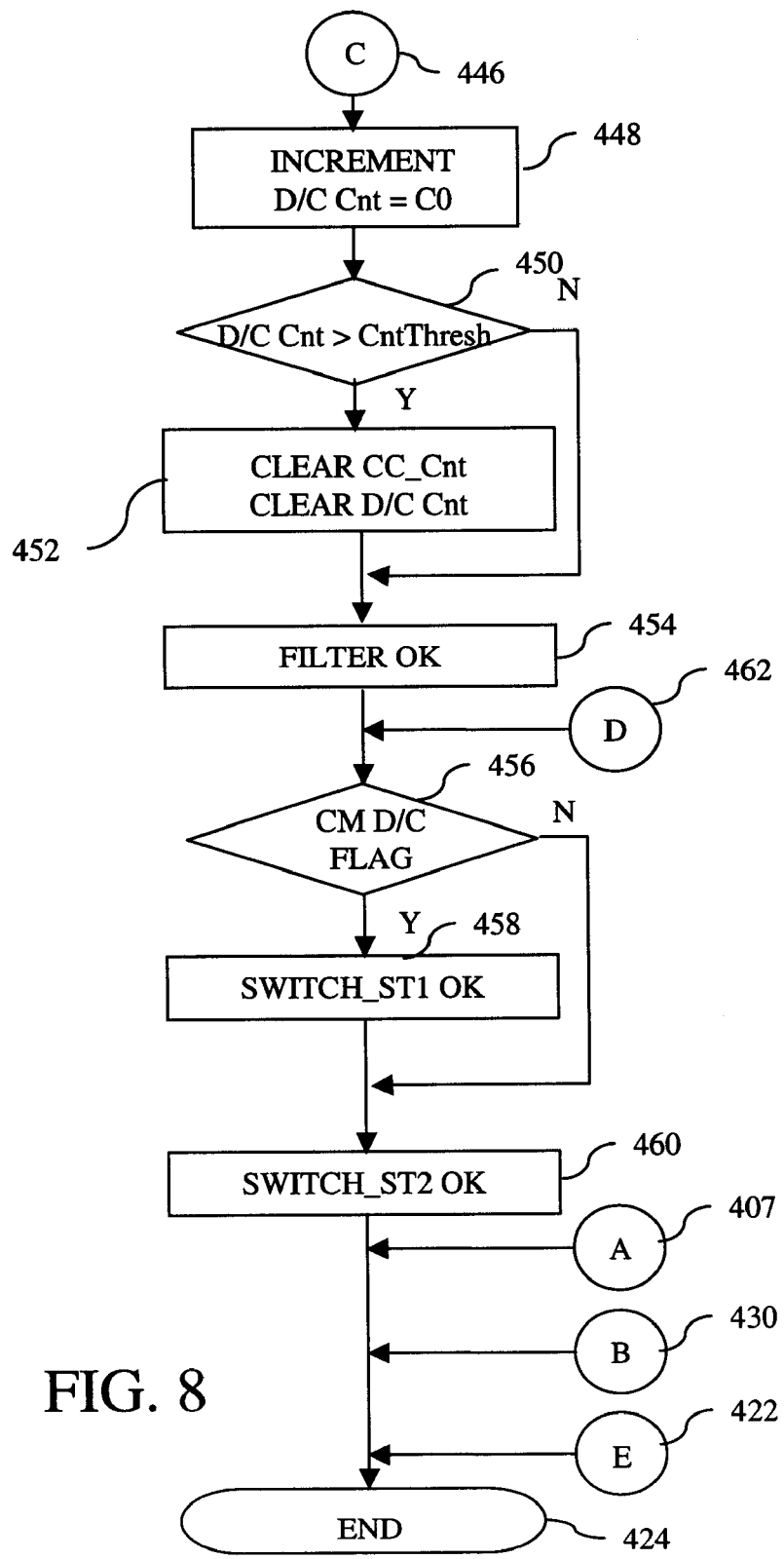

Referring now to FIGS. 7 and 8, a flowchart illustrating a method 400 for evaluating the fluid filter using the pressure switch and device 10 at engine shutdown is provided, in accordance with an embodiment of the present invention. Method 400 is initiated at block 402. At block 404, the method determines the transmission mode and whether the engine is off. The method determines the transmission mode and the status of the engine by monitoring engine speed, transmission input speed, transmission output shaft speed and turbine speed and compares the monitored values to a threshold value. If the monitored values exceed the predefined threshold values then the engine is judged to be operating. If the engine has not been shutdown then method terminates, as represented by blocks 405, 407 (of FIG. 8) and 424 (of FIG. 8). However, if the engine has been shutdown then the output of the pressure switch is monitored, at block 408. At block 410, timer (Tfail1) is initialized and set to zero.

Tfail1 is compared to a Tfail1threshold, as represented by block 412. If Tfail 1 is greater than Tfail1threshold, then the fluid filter is determined to be functioning properly, the switch has not failed in state 1 (SWITCH_ST1=OK), the Tcumu timer is cleared or set to zero and a code clear counter CC_Cnt is cleared or set to zero, at block 416. At block 418, a diagnostic code indicating the pressure switch has failed in state 2 (SWITCH_ST2) is set and a customer indicator is activated indicating that the pressure switch requires maintenance. The method terminates thereafter, as represented by blocks 420, 422 (of FIG. 8) and 424 (of FIG. 8).

However, if at block 412 it is determined that Tfail1 is not greater than Tfail1threshold, then the pressure switch output is determined, at block 426. If the output of the pressure switch is not zero or at a high voltage level, then the method terminates, as represented by blocks 428, 430 (of FIG. 8) and 424 (of FIG. 8). However, if the output of the pressure switch is zero or at a low voltage level, then the method determines whether the plugged filter flag has been set (see FIG. 5, block 218), as represented by block 432. If the plugged filter flag has been set, then the method determines if the converter mode drive cycle flag (CM D/C flag) has been set, as represented by block 434. If the CM D/C flag has been set, then the method determines that the pressure switch has not failed in state 1 (SWITCH_ST1=ok), as represented by block 436. If the CM D/C flag has not been set, then the method does not determine that the pressure switch has not failed in state 1. At block 438, the method determines that the pressure switch has not failed in state 2 (SWITCH_ST2=ok) and a diagnostic code is set and a customer indicator is activated indicating that the fluid filter requires maintenance. The method terminates thereafter, as represented by blocks 420, 422 (of FIG. 8) and 424 (of FIG. 8).

However, if at block 432 the method determines that the plugged filter flag has not been set, then the method determines if the lockup drive cycle flag (LU D/C flag) has been set, as represented by block 440. If the lockup drive cycle flag (LU D/C flag) has been set, then at block 442 the method clears the current and cumulative drive timers (Tcurr and Tcumu). As represented by blocks 444, 446 (of FIG. 8) and 448 (of FIG. 8), a drive cycle counter (D/C Cnt) is initialized and incremented, see FIG. 8. At block 450 of FIG. 8, D/C Cnt is compared to a predefined drive cycle counter threshold (Cntthreshold). If D/C Cnt is greater than Cntthreshold, then the method clears the code clear counter (CC_Cnt) and the drive cycle counter (D/C Cnt), as represented by block 452. However, if D/C Cnt is not greater than Cntthreshold then the method does not clear the CC_Cnt and D/C Cnt, as represented by block 450. At block 454, the filter is determined to be functioning properly and does not require maintenance. At block 456, the method determines whether the converter mode drive cycle flag (CM D/C flag) has been set. If the method determines that the CM D/C flag has been set, then it is determined that the pressure switch has not failed in state 1 (SWITCH_ST1=ok), as represented by block 458. However, if the method determines that the converter mode flag (CM D/C flag) has not been set, then SWITCH_ST1 is not determined to be functioning properly, as represented by block 456. At block 460, the method determines that the pressure switch has not failed in state 2 (SWITCH_ST2=ok). The method terminates thereafter, as represented by block 424.

However, if at block 440 of FIG. 7 the method determines that the drive cycle lockup flag (LU D/C flag) has not been set, then the method at block 441 jumps to block 462 (of FIG. 8) and continues to block 456, as described above.

Figure 9:
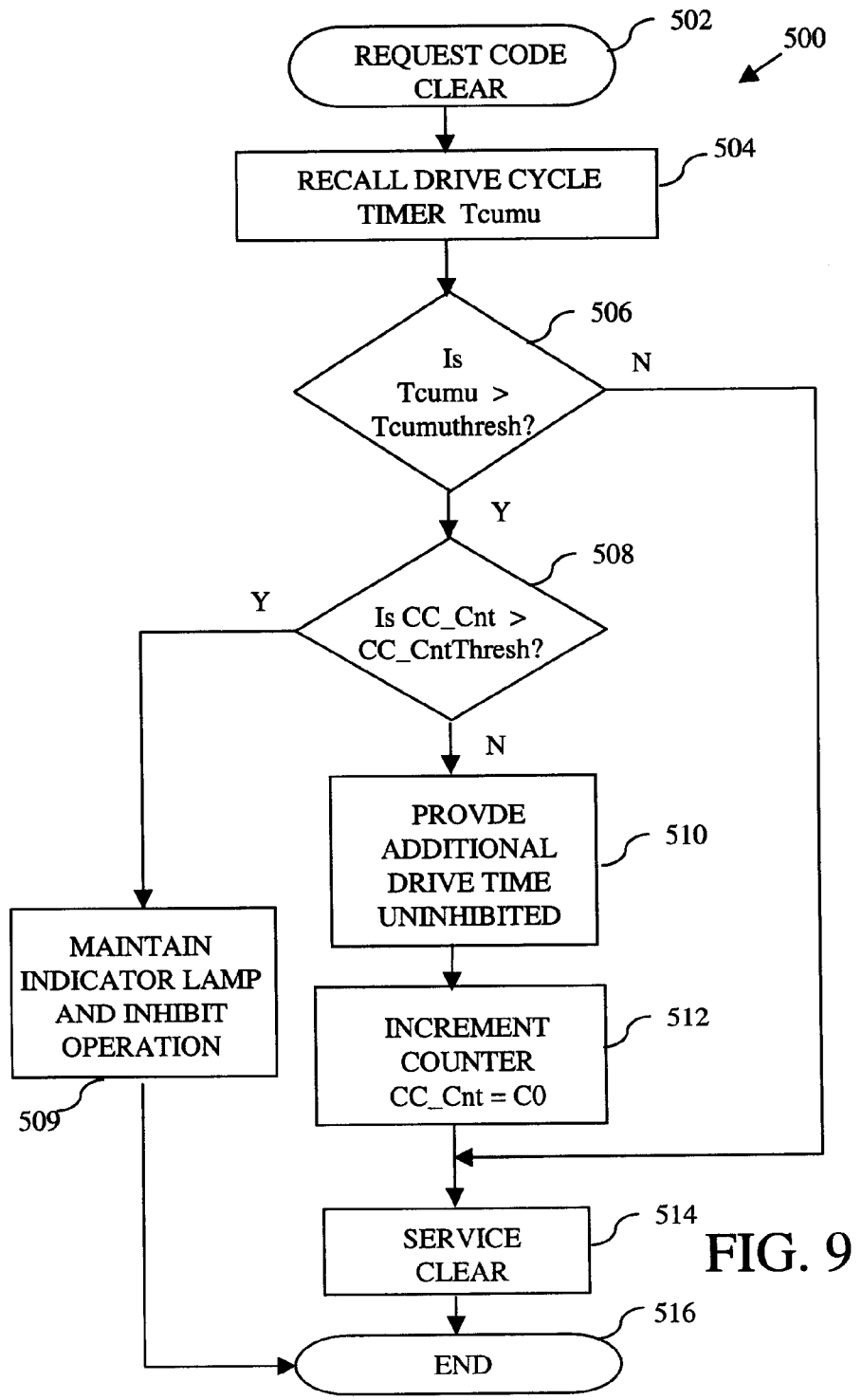
FIG. 9 is a flowchart illustrating a method for handling a request from the vehicle operator to clear codes, in accordance with an embodiment of the present invention.

Referring now to FIG. 9, a flowchart illustrating a method 500 for handling a request from the vehicle operator to clear codes is provided, in accordance with an embodiment of the present invention. Method 500 is initiated at block 502. At block 504, the method recalls the drive cycle timer (Tcumu). At block 506, the method compares Tcumu to a predefined cumulative drive cycle time threshold (Tcumuthresh). If Tcumu is determined not to be greater than Tcumuthresh, then the method clears the diagnostic codes, as represented by block 506 and 514.

However, if Tcumu is determined to be greater than Tcumuthresh, then the method compares the clear code count (CC_cnt) with a predefined threshold (CC_CntThreshold), as represented by block 508. If CC_cnt is determined to be greater than CC_CntThreshold, then the method does not allow the operator to clear the diagnostic codes or shutoff the indicator lamp and maintains inhibiting the transmission (i.e. reduced gear shift range), as represented by blocks 508 and 509. The method terminates there after at block 516.

However, if CC_cnt is determined not to be greater than CC_CntThreshold, then the method provides additional drive time without inhibiting transmission operation to allow the operator of the vehicle to get to a service station or maintenance area where the vehicle can be serviced, as represented by block 510. At block 512, CC_cnt is set to zero or initialized and then incremented. At block 514, the diagnostic codes are cleared and the method terminates at block 516.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A method for determining the condition of a transmission fluid filter in a vehicle having an engine coupled to a transmission and controlling an operator indicator to alert an operator of the vehicle that the fluid filter requires replacement, the method comprising:
   monitoring a fluid pressure switch;
   determining an operating mode of the transmission;
   determining whether the operating mode of the transmission is changing;
   activating a timer if the operating mode is changing;
   recording the time;
   comparing the time to a predefined time threshold;
   determining whether the recorded time is greater than the predefined threshold; and
   activating an operator indicator to indicate that the fluid filter requires replacement if the recorded time is greater than the predefined threshold.

2. The method of claim 1, further comprising determining whether the fluid pressure switch is cycling between an on and an off state.

3. The method of claim 2, further comprising activating a cycling timer to record the number of times the pressure switch cycles.

4. The method of claim 3, further comprising comparing the number of cycles to a predefined cycle threshold.

5. The method of claim 4, further comprising activating the operator indicator to indicate that the fluid filter requires replacement if the recorded cycles is greater than the predefined cycle threshold.

6. The method of claim 1, wherein determining an operating mode further comprises determining whether the torque converter of the transmission is operating.

7. The method of claim 1, wherein determining an operating mode further comprises determining whether a lockup clutch of the transmission is operating.

8. The method of claim 1, wherein determining an operating mode further comprises determining whether an ignition is on and the engine is off.

9. The method of claim 1, further comprising activating drive cycle timers.

10. The method of claim 9, wherein activating drive cycle timers further comprises activating a current drive cycle time and a cumulative drive cycle timer.

11. The method of claim 9, wherein activating drive cycle timers further comprises comparing a current drive cycle time to a predefined current drive cycle time threshold and activating the operator indicator if the current drive cycle time is greater than a predefined current drive cycle time threshold.

12. The method of claim 9, wherein activating drive cycle timers further comprises comparing a cumulative drive cycle time to a predefined cumulative drive cycle time threshold and activating the operator indicator if the cumulative drive cycle time is greater than a predefined cumulative drive cycle time threshold.

13. The method of claim 1, wherein determining an operating mode further comprises determining whether the engine is not operating.

14. The method of claim 13, further comprising activating an engine shutdown timer and comparing an engine shutdown time to a predefined engine shutdown time threshold.

15. The method of claim 14, further comprising activating the operator indicator if the engine shutdown time is greater than the predefined engine shutdown time threshold.

16. The method of claim 1, further comprising determining whether the operator has requested to reset a diagnostic code.

17. The method of claim 16, wherein determining whether the operator has requested to reset a diagnostic code further comprises determining whether a cumulative drive cycle timer has exceed a predefined drive cycle timer threshold.

18. The method of claim 17, further comprising determining whether a code clear counter has exceeded a predefined code clear counter threshold when the cumulative drive cycle timer has exceeded the predefined drive cycle timer threshold.

19. The method of claim 18, further comprising resetting the diagnostic code when the code clear counter has not exceeded the predefined code clear counter threshold and providing additional uninhibited drive time.

20. The method of claim 18, further comprising maintaining the diagnostic code when the code clear counter has exceeded the predefined code clear counter threshold and inhibiting operation of the transmission.

* * * * *